United States Patent
Kim et al.

(10) Patent No.: US 7,271,949 B2
(45) Date of Patent: Sep. 18, 2007

(54) MULTI-WAVELENGTH LIGHT SOURCE AND WAVELENGTH DIVISION MULTIPLEXING SYSTEM USING THE SAME

(75) Inventors: Sang-Ho Kim, Suwon-si (KR); Seong-Taek Hwang, Pyeongtaek-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 186 days.

(21) Appl. No.: 10/853,969

(22) Filed: May 26, 2004

(65) Prior Publication Data

US 2005/0141077 A1    Jun. 30, 2005

(30) Foreign Application Priority Data

Dec. 30, 2003    (KR) ............... 10-2003-0100257

(51) Int. Cl.
*H04B 10/17*    (2006.01)

(52) U.S. Cl. .................... 359/337.21; 398/72
(58) Field of Classification Search ............ 398/72; 359/333, 337.21
See application file for complete search history.

(56) References Cited

U.S. PATENT DOCUMENTS

| | | | | |
|---|---|---|---|---|
| 3,484,713 A | * | 12/1969 | Fenner ............... | 372/44.01 |
| 5,337,175 A | * | 8/1994 | Ohnsorge et al. ...... | 398/72 |
| 5,517,232 A | * | 5/1996 | Heidemann et al. ..... | 725/98 |
| 5,579,143 A | * | 11/1996 | Huber ................ | 398/72 |
| 5,659,351 A | * | 8/1997 | Huber ................ | 725/101 |
| 5,694,234 A | * | 12/1997 | Darcie et al. ........ | 398/72 |
| 5,793,506 A | * | 8/1998 | Schmid ............... | 398/72 |
| 5,801,864 A | * | 9/1998 | Takai et al. ......... | 398/72 |
| 5,808,764 A | * | 9/1998 | Frigo et al. ......... | 398/72 |
| 5,936,753 A | * | 8/1999 | Ishikawa ............. | 398/72 |
| 5,969,836 A | * | 10/1999 | Foltzer .............. | 398/72 |
| 5,991,058 A | * | 11/1999 | Feuer et al. ......... | 398/72 |
| 6,108,112 A | * | 8/2000 | Touma ................ | 398/10 |
| 6,282,016 B1 | * | 8/2001 | MacCormack et al. | 359/341.41 |
| 6,356,369 B1 | * | 3/2002 | Farhan ............... | 398/72 |
| 6,407,855 B1 | * | 6/2002 | MacCormack et al. .... | 359/346 |
| 6,532,099 B2 | * | 3/2003 | Fuse ................. | 359/278 |
| 6,721,506 B1 | * | 4/2004 | Lam .................. | 398/70 |
| 6,832,046 B1 | * | 12/2004 | Thomas ............... | 398/72 |
| 6,970,653 B1 | * | 11/2005 | Dudley ............... | 398/169 |
| 6,973,271 B2 | * | 12/2005 | Farmer et al. ........ | 398/68 |

(Continued)

FOREIGN PATENT DOCUMENTS

JP    09-015422    1/1997

OTHER PUBLICATIONS

Wikipedia, the free encyclopedia. Optical amplifier. Multiple contributors. Uploaded: Apr. 23, 2006. Downloaded: May 4, 2006. http://en.wikipedia.org/w/index.php?title=Optical_amplifier&oldid=49795867.*

*Primary Examiner*—Jack Keith
*Assistant Examiner*—Ari M. Diacou
(74) *Attorney, Agent, or Firm*—Cha & Reiter, L.L.C.

(57) ABSTRACT

A multi-wavelength light source includes an amplifier for generating light over a wide wavelength range; and, an optical fiber grating including a plurality of gratings formed on an optical fiber in in parallel with each other, thereby dividing the light inputted from the amplifier into respective channels having different wavelengths to reflect the divided channels to the amplifier. The amplifier amplifies each channel reflected in the gratings.

7 Claims, 6 Drawing Sheets

U.S. PATENT DOCUMENTS

| | | | |
|---|---|---|---|
| 2001/0048799 A1* | 12/2001 | King et al. | 385/125 |
| 2002/0015203 A1* | 2/2002 | BuAbbud | 359/125 |
| 2002/0033977 A1* | 3/2002 | Birk et al. | 359/124 |
| 2004/0141748 A1* | 7/2004 | Spickermann et al. | 398/72 |
| 2004/0202484 A1* | 10/2004 | Shraga et al. | 398/168 |
| 2004/0264964 A1* | 12/2004 | BuAbbud | 398/72 |
| 2005/0147412 A1* | 7/2005 | Park et al. | 398/72 |
| 2005/0244160 A1* | 11/2005 | Seo | 398/72 |
| 2005/0259988 A1* | 11/2005 | Jung et al. | 398/72 |

* cited by examiner

MULTI-WAVELENGTH LIGHT SOURCE AND WAVELENGTH DIVISION MULTIPLEXING SYSTEM USING THE SAME

CLAIM OF PRIORITY

This application claims priority to an application entitled "Multi-wavelength light source and wavelength division multiplexing system using the same," filed in the Korean Intellectual Property Office on Dec. 30, 2003 and assigned Serial No. 2003-100257, the contents of which are hereby incorporated by reference.

BACKGROUND OF THE INVENTION

1. Field of the Invention

The present invention relates to a wavelength division multiplexed optical communication system, and more particularly to a light source used for generating a plurality of optical signals having different wavelengths.

2. Description of the Related Art

In a conventional wavelength division multiplexed optical communication system, a central office provides a plurality of optical signals having different wavelengths to subscriber units, and a remote node located between the subscriber units and the central office serves to connect the central office to each subscriber unit.

The central office includes an optical transmitter for generating optical signals having different wavelengths to be transmitted to each subscriber unit. The optical transmitter includes a light source for generating a plurality of channels having predetermined wavelengths and a modulator for modulating each of the channels into an optical signal.

FIG. 1 is a block diagram showing a construction of a conventional wavelength division multiplexed (WDM) optical communication system. As shown, the WDM system includes a central office 110 for generating downstream optical signals, a plurality of subscriber units 130-1 to 130-n for generating upstream optical signals, and a remote node 120 for demultiplexing a multiplexed downstream optical signal, and multiplexing the upstream optical signals for subsequent transmission to the central office 110.

The central office 110 includes a multiplexer/demultiplexer 114, a plurality of optical transmitters 111, and photodetectors 113 to demultiplexe the multiplexed upstream optical signal received from each subscriber unit and multiplexes the downstream optical signals having different wavelengths to output the multiplexed optical signal to the remote node 120.

The multiplexer/demultiplexer 114 demultiplexes the multiplexed upstream optical signals, which are received from the remote node 120, to respective wavelengths, and the photodetectors 113 detect corresponding demultiplexed upstream optical signals.

The optical transmitters 111 may include a light source for generating channels having predetermined wavelengths and a modulator for modulating the channels. For long distance transmission, the light source may use a distributed feedback laser capable of outputting a channel having a single wavelength or an electro-absorption modulator laser including a modulator and a light source.

The remote node 120 is linked to a central office 110 through a single optical fiber and is located between the subscriber units 130-1 to 130-n and the central office 110, connecting the subscriber units 130-1 to 130-n to the central office.

Each of the subscriber units 130-1 to 130-n includes a light source 132 for generating the upstream optical signals, and a photodetector 133 for detecting a corresponding downstream optical signal, so that each subscriber unit detects the downstream optical signal and outputs the upstream optical signal to the remote node 120.

The abovementioned central office, however, includes a plurality of light sources for generating a channel having a single wavelength, thereby increasing the cost required for constructing a wavelength division multiplexed communication system. Furthermore, a number of light sources required for long distance transmission used in a local area network further increases the installation cost of such a communication network.

SUMMARY OF THE INVENTION

Accordingly, the present invention has been made to solve the above-mentioned problems occurring in the prior art and provides additional advantages, by providing a multi-wavelength light source which can be employed as an optical transmitter in a wavelength division multiplexed local area network.

According to one aspect of the present, there is provided a multi-wavelength light source comprising: an amplifier for generating light over a wide wavelength range; and, an optical fiber grating including a plurality of gratings formed on an optical fiber in parallel with each other, thereby dividing the input light from the amplifier into respective channels having different wavelengths to reflect the divided channels to the amplifier, wherein the amplifier amplifies each channel reflected in the gratings.

BRIEF DESCRIPTION OF THE DRAWINGS

The above features and advantages of the present invention will be more apparent from the following detailed description taken in conjunction with the accompanying drawings, in which.

DETAILED DESCRIPTION

Hereinafter, embodiments according to the present invention will be described with reference to the accompanying drawings. For the purposes of clarity and simplicity, a detailed description of known functions and configuration incorporated herein will be omitted as it may make the subject matter of the present invention unclear.

Figure 1:
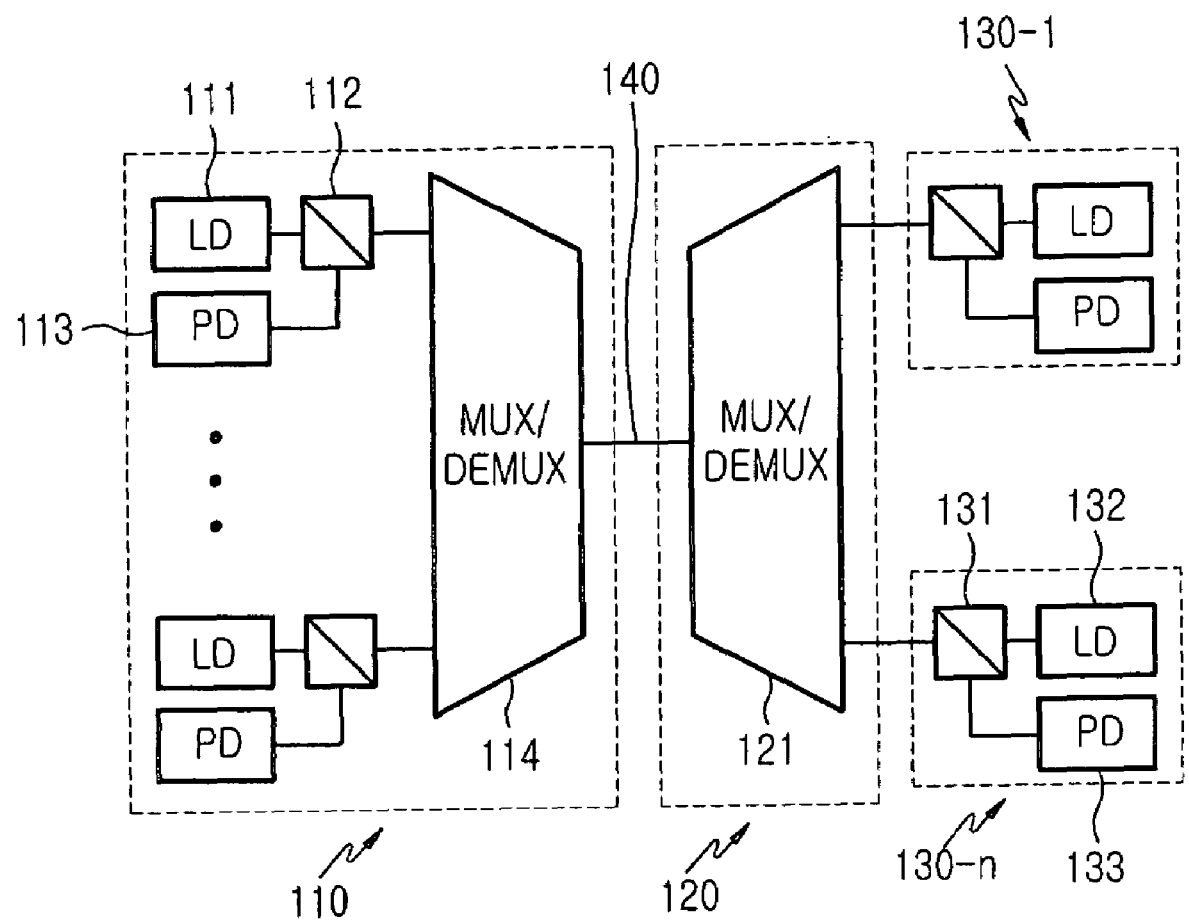
FIG. 1 is a block diagram showing the construction of a conventional wavelength division multiplexed optical communication system.
Figure 2:
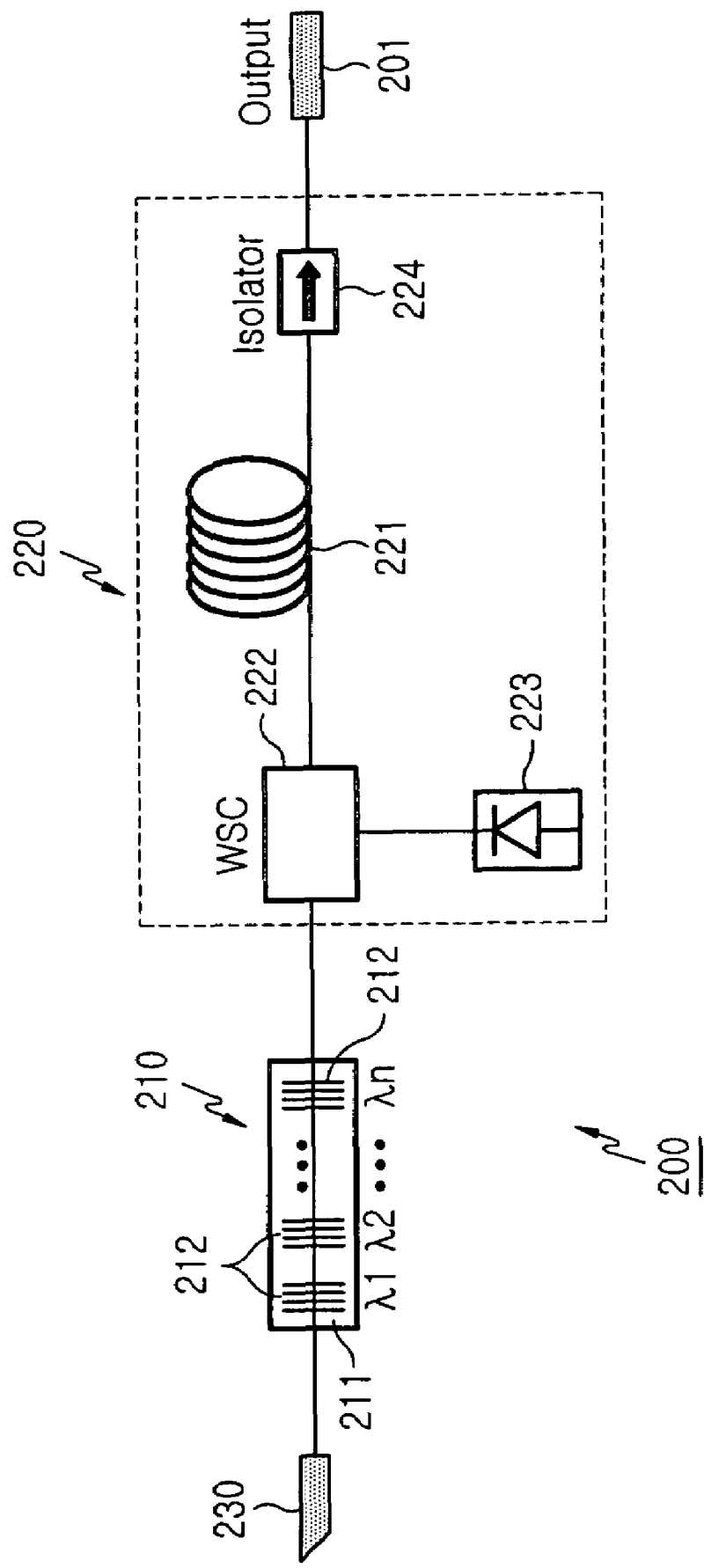
FIG. 2 is a view showing the construction of a multi-wavelength light source according to a first embodiment of the present invention.

FIG. 2 is a view showing the construction of a multi-wavelength light source according to a first embodiment of the present invention. As shown, the multi-wavelength light source 200 includes an amplifier 220 for generating light over a wide wavelength range, an optical fiber grating 210 for dividing the light into channels having different wavelengths, and a tilted connector 230.

The amplifier 220 includes an amplifying medium 221, a pump light source 223, a wavelength selective coupler 222, and an isolator 224. The multi-wavelength light source 200 generates light over a wide wavelength range to output the generated light to one end of the optical fiber grating 210, and amplifies the channels having different wavelengths, which are inputted from the optical fiber grating 210, to output the amplified channels from the multi-wavelength light source 200 through an output terminal 201.

The amplifying medium 221 may include a thulium (Tm)-doped optical fiber amplifier (TDFA) capable of generating light having a wavelength band of 1450 nm~1510 nm, a praseodymium-doped optical fiber amplifier capable of generating light having a wavelength band of 1270 nm~1330 nm, or a rare-earth doped fiber amplifier such as an erbium-doped fiber amplifier (EDFA). Further, the amplifying medium 221 may adjust a wavelength band of light, which can be generated, according to the length and type of the doped rare-earth.

The pump light source 223 generates pump light for pumping the amplifying medium 221, and the amplifying medium 221 is pumped by the pump light to generate light having a predetermined wavelength range. The wavelength selective coupler 222 is located between the optical fiber grating 210 and the amplifying medium 221 to output the pump light to the amplifying medium 221 and to output the light, which is received from the amplifying medium 221, to the optical fiber grating 210.

The isolator 224 outputs each channel amplified by the amplifying medium 221 to the output terminal 201, while blocking light progressing in reverse from the output terminal 201 to the amplifying medium 221.

The optical fiber grating 210 includes a plurality of gratings 212 having different wavelengths formed on an optical fiber in series, thereby dividing the light over the wide wavelength range inputted from the amplifier 220 into respective channels having different wavelengths and outputting the same to the amplifier 220.

The gratings 212 include Bragg gratings sequentially formed from a first-order to an N-order, which have Bragg wavelengths between $\lambda_1$~$\lambda_N$. The gratings 212 divides the light from the amplifier 220 into channels with different wavelengths. Herein, sampled gratings may be used as the gratings 212.

Note that insertion loss of the channel intensity reflected by each of the gratings 212 may be influenced by a spectrum of the light inputted from the amplifier 220 to one end of the optical fiber grating 210 and the position of each gratings 212. According to the teachings of the invention, as the abovementioned insertion loss may also occur according to a wavelength of the light generated in the amplifier 220, a channel having a large loss from among the channels reflected by the Bragg gratings is located at a position at which a gain spectrum of the light generated in the amplifying medium 221 is large, thereby minimizing the difference of the insertion loss between the gratings. Also, the gain spectrum of the light generated in the amplifying medium 221 can be adjusted according to the intensity of the pump light generated in the pump light source 223. That is, the intensity of the pump light generated in the pump light source 223 is adjusted, so that a plurality of channels having uniform intensity can be generated. A wavelength interval between the channels outputted from the optical fiber grating 210 may have a value of 100 GHz (0.8 nm) as proposed by an ITU Grid.

The tilted connector 230 is connected to the other end of the optical fiber grating 210 to prevents a diffused reflection of light passing through the Bragg gratings 212 from occurring. That is, the tilted connector 230 outputs a portion of the light generated in the amplifying medium 221, which is in a wavelength range including wavelengths except for the wavelengths of the channels reflected by the Bragg gratings 212, without a diffused reflection from the multi-wavelength light source 200.

Figure 5:
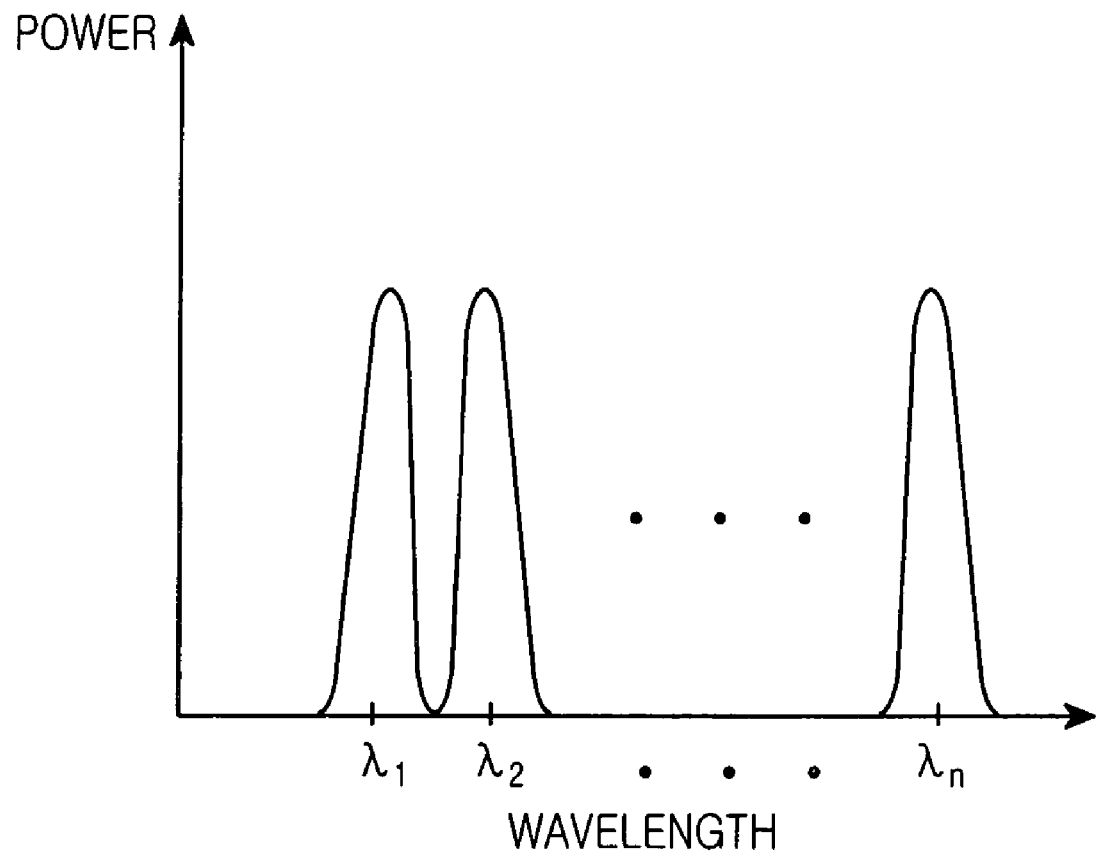
FIG. 5 is a graph showing light over a wide wavelength range generated in an amplifying medium shown in FIG. 2.

FIG. 5 is a graph showing channels reflected in the optical fiber grating shown in FIG. 2. As shown, the light having the wide wavelength band generated in the amplifying medium 221 includes a plurality of channels $\lambda_1$~$\lambda_N$ with different wavelengths, and the optical fiber grating 210 divides the light into respective channels.

Figure 3:
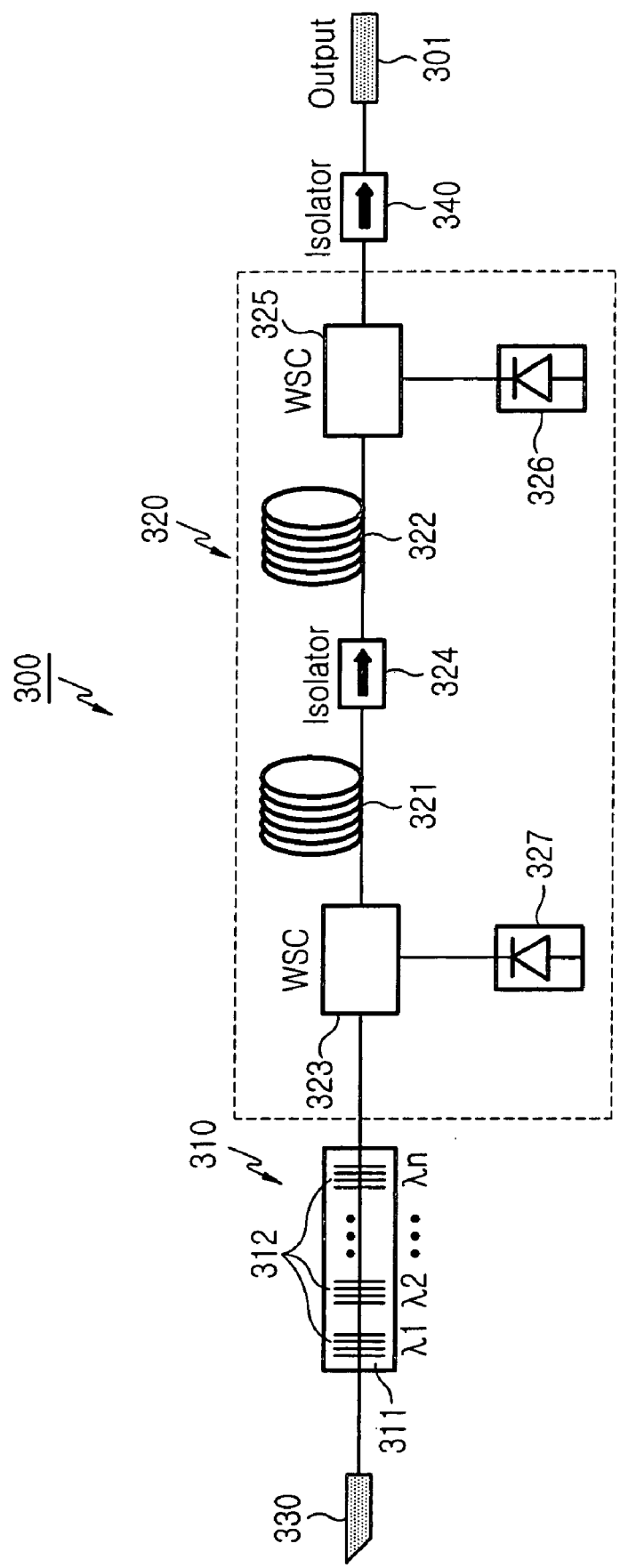
FIG. 3 is a view showing the construction of a multi-wavelength light source according to a second embodiment of the present invention.

FIG. 3 is a view showing the construction of a multi-wavelength light source according to a second embodiment of the present invention. As shown, the multi-wavelength light source 300 includes an amplifier 320 for generating light over a wide wavelength range, an optical fiber grating 310 for dividing the light into channels having different wavelengths, a tilted connector 330, and a second isolator 306.

The optical fiber grating 310 includes a plurality of gratings 312 have different wavelengths, thereby dividing the light inputted from the amplifier 320 into respective channels with different wavelengths and reflecting the channels to the amplifier 320.

The gratings 312 may use a plurality of Bragg gratings having different periods or sampled gratings, and the Bragg gratings are sequentially formed on an optical fiber 311 from a first-order to an N-order according to Bragg wavelengths between $\lambda_1$ to $\lambda_N$. The Bragg gratings adjust intervals between the Bragg wavelengths, so that the number of channels to be generated can be adjusted. Herein, the intervals between the Bragg wavelengths may be an integer time of 50 GHz (0.4 nm).

The tilted connector 330 outputs a portion of the light inputted from the amplifier 320 to the optical fiber grating 310 which is in a wavelength range except for wavelengths of the channels reflected to the amplifier 320 without a diffused reflection from the multi-wavelength light source 300.

The amplifier 320 includes a first amplifying medium 321, a second amplifying medium 322, a first isolator 324 located between the first and the second amplifying mediums 321 and 322, a first and a second wavelength selective coupler 323 and 325, and a first and a second pump light source 327 and 326.

The first amplifying medium 321 generates light over a wide wavelength range in order to output the generated light to the optical fiber grating 310, and amplifies the channels inputted from the optical fiber grating 310 and outputs the same to the first isolator 324.

The first isolator 324 outputs the channels inputted from the first amplifying medium 321 to the second amplifying medium 322, while preventing a spontaneous emission light generated in the second amplifying medium 322 or some channels reflected in the second amplifying medium 322 from being inputted to the first amplifying medium 321.

The second amplifying medium 322 amplifies the channels amplified in the first amplifying medium 321 and outputs the amplified channels to the second wavelength selective coupler 325. Further, the second amplifying medium 322 is pumped by the second pump light source 326, so that spontaneous emission light can be generated. The spontaneous emission light is outputted to the second wavelength selective coupler 325.

The first pump light source 327 generates a first pump light for pumping the first amplifying medium 321 and outputs the first pump light to the first wavelength selective coupler 323.

The first wavelength selective coupler 323 is located between one end of the optical fiber grating 310 and the first amplifying medium 321, so that the first wavelength selective coupler 323 outputs the first pump light, which is inputted from the first pump light source 327, to the first amplifying medium 321. Further, the first wavelength selective coupler 323 outputs light generated in the first amplifying medium 321 to the optical fiber grating 310, and outputs a plurality of channels having different wavelengths, which are inputted from the optical fiber grating 310, to the first amplifying medium 321.

The second isolator 340 outputs the channels, which are inputted from the second amplifying medium 322, to an output terminal 301 of the multi-wavelength light source 300, and prevents light progressing in reverse, from the output terminal 301 to the amplifier 320, from being inputted.

The second pump light source 326 generates a second pump light for pumping the second amplifying medium 322 and outputs the second pump light to the second wavelength selective coupler 325.

The second wavelength selective coupler 325 is located between the second isolator 340 and the second amplifying medium 322, so that the second wavelength selective coupler 325 outputs channels secondarily amplified by the second amplifying medium 322 to the second isolator 340. Further, the second wavelength selective coupler 325 outputs the second pump light, which is inputted from the second pump light source 326, to the second amplifying medium 322.

Figure 4:
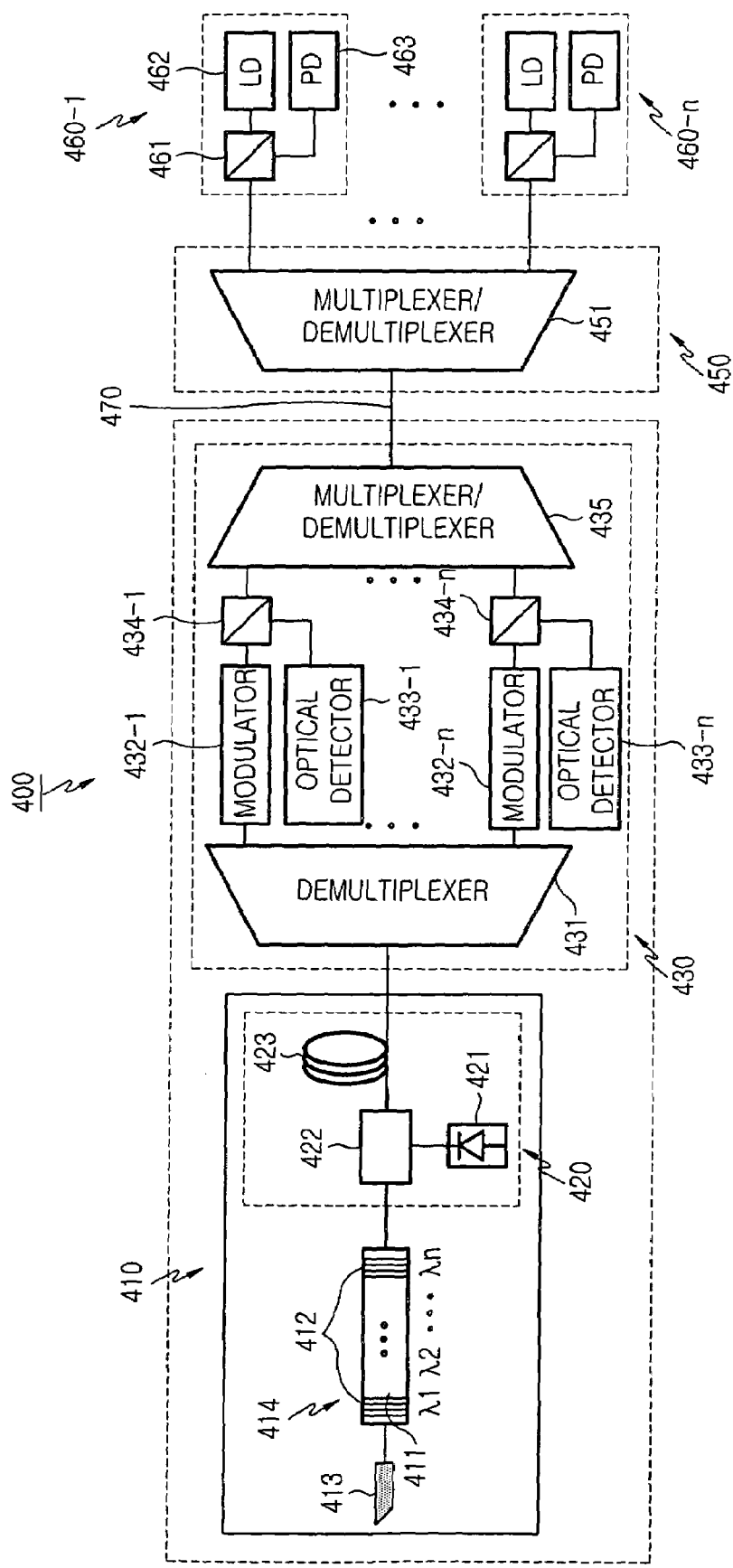
FIG. 4 is a view showing the construction of a wavelength division multiplexed system including a multi-wavelength light source according the present invention.

FIG. 4 is a view showing the construction of a wavelength division multiplexed system including a multi-wavelength light source according the present invention. As shown, the wavelength division multiplexed system according to the third embodiment of the present invention includes a central office 400, a plurality of subscriber units 460-1 to 460-n, and a remote node 120. The central office 400 generates a plurality of downstream optical signals having different wavelengths, and the subscriber units 460-1 to 460-n generates upstream optical signals. Further, the remote node 120 is located between the central office 400 and the subscriber units 460-1 to 460-n, and connects the subscriber units 460-1 to 460-n to the central office 400.

The central office 400 includes a multi-wavelength light source 410 for generating a plurality of downstream channels having different wavelengths, and an optical modulation section 430 for modulating the downstream channels into respective downstream optical signals.

The multi-wavelength light source 410 includes an amplifier 420 for generating light over a wide wavelength range, an optical fiber grating 414 for dividing the light into the downstream channels having different wavelengths to reflect the channels to the amplifier 420. Note that the multi-wavelength light source 410 may have constructions according to the first and the second embodiments of the present invention.

The amplifier 420 includes an amplifying medium 423 for generating the light and amplifying the downstream channels, a pump light source 421 for pumping the amplifying medium 423, and a wavelength selective coupler 422.

The amplifying medium 423 may employ a thulium-doped optical fiber capable of generating light having a wavelength band of 1450 nm~1510 nm, a rare-earth doped fiber capable of generating light having a wavelength band of 1270 nm~1330 nm such as a praseodymium-doped optical fiber. The amplifying medium 423 may adjust a wavelength range of generated light according to the type of the rare-earth or the length of the rare-earth. The light over the wide wavelength range generated in the amplifying medium 423 is spontaneous emission light.

The optical fiber grating 414 includes a plurality of gratings 412, and the gratings 412 may use Bragg gratings having different Bragg wavelengths or sampled gratings. The optical fiber grating 414 divides the light generated in the amplifying medium 423 into downstream channels having different wavelengths, and reflects the downstream channels to the amplifying medium 423. Further, the amplifying medium 423 amplifies the channels reflected by the optical fiber grating 414 and outputs the amplified channels to the optical modulation section 430.

The optical modulation section 430 includes a demultiplexer 431 for demultiplexing the downstream channels, a plurality of modulators 432-1 to 432-n, a plurality of photodetectors 433-1 to 433-n, a plurality of wavelength selective couplers 434-1 to 434-n, and a multiplexer/demultiplexer 435 located between the modulators 432-1 to 432-n and the remote node 450.

The demultiplexer 431 demultiplexes each of the downstream channels to output the demultiplexed channels to the modulators 432-1 to 432-n. Each of the modulators 432-1 to 432-n modulates a corresponding downstream channel into a downstream optical signal containing data to be transmitted and outputs the optical signal to the multiplexer/demultiplexer 435.

The multiplexer/demultiplexer 435 demultiplexes upstream optical signals inputted from the remote node 450 into respective upstream channels having different wavelengths and outputs the demultiplexed upstream channels to the wavelength selective couplers 434-1 to 434-n. Further, the multiplexer/demultiplexer 435 multiplexes the downstream optical signals inputted from the wavelength selective couplers 434-1 to 434-n and outputs the multiplexed optical signal to the remote node 450.

Each of the wavelength selective couplers 434-1 to 434-n is located between each of the modulators 432-1 to 432-n and the multiplexer/demultiplexer 435, thereby outputting the downstream optical signals, which are inputted from each of the modulators 432-1 to 432-n, to the multiplexer/demultiplexer 435. Further, each of the wavelength selective couplers 434-1 to 434-n outputs a corresponding upstream channel, which is inputted from the multiplexer/demultiplexer 435, to each of the photodetectors 433-1 to 433-n.

Each of the photodetectors 433-1 to 433-n detects a corresponding upstream channel inputted from the wavelength selective couplers 434-1 to 434-n.

The remote node 450 includes a multiplexer/demultiplexer 451, thereby demultiplexing the multiplexed downstream optical signal, which is inputted from the central office 400, according to the respective wavelengths and outputs the demultiplexed optical signal to a corresponding subscriber unit 460-1, . . . , or 460-n. Further, the remote node 450 multiplexes the upstream optical signals inputted from each of the subscriber units 460-1 to 460-n and outputs the multiplexed optical signal to the central office 400.

Each of the subscriber units 460-1 to 460-n includes a wavelength selective coupler 461, a light source 462, and a photodetector 463, thereby detecting a corresponding downstream optical signal from among the downstream optical signals demultiplexed in the remote node 450 and outputting the upstream optical signals to the remote node 450.

Figure 6:
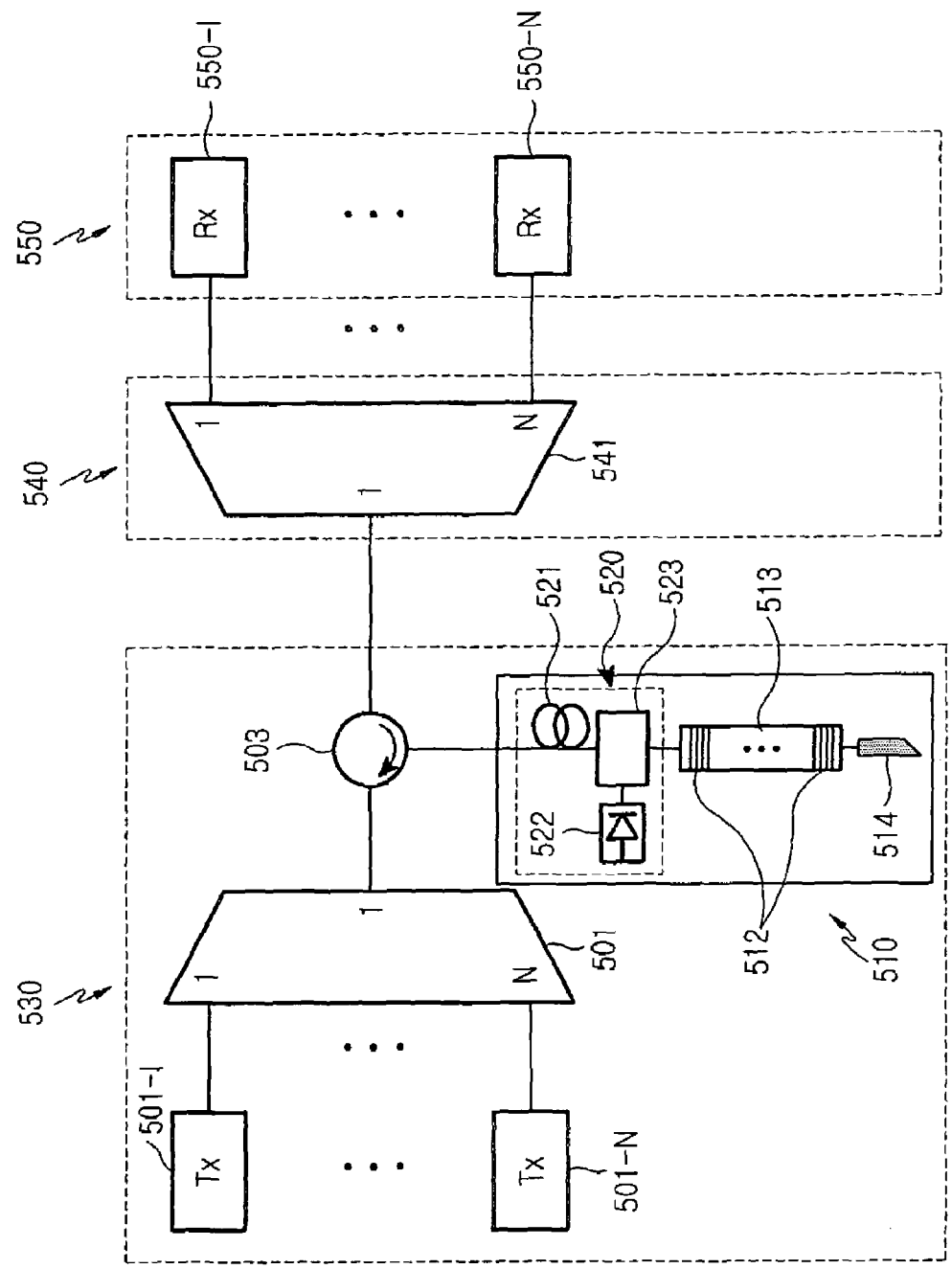
FIG. 6 is a view showing the construction of a wavelength division multiplexed system including a multi-wavelength light source according to the present invention.

FIG. 6 is a view showing the construction of a wavelength division multiplexed system including a multi-wavelength light source according another embodiment of the present invention. As shown, the wavelength division multiplexed system according the present invention includes a central office 530 for generating downstream optical signals, an optical node unit 550, and a remote node 540. The optical node unit 550 includes a plurality of subscriber units 550-1 to 550-n for receiving corresponding downstream optical signals. The remote node 540 connects the central office 530 to the subscriber units 550-1 to 550-n. The central office 530 is linked to the remote node 540 through a single mode optical fiber, and the remote node 540 is linked to the subscriber units 550-1 to 550-n each through another single mode optical fiber. Note that the wavelength division multiplexing system shown in FIG. 6 is one example of a construction of a passive optical network.

The central office 530 includes a multi-wavelength light source 510, a multiplexer/demultiplexer 501, a plurality of semiconductor light sources (Tx) 501-1 to 501-N, and a circulator 503 located between the multiplexer/demultiplexer 501 and the remote node 540.

The multi-wavelength light source 510 includes an amplifier 520 for generating light over a wide wavelength range, an optical fiber grating 513, and a tilted connector 514. The optical fiber grating 513 divides the light into a plurality of downstream channels having different wavelengths to reflect the channels to the amplifier 520. The tilted connector 514 prevents some downstream channels, which are not reflected from the optical fiber grating 513, to an amplifying medium 521.

The optical fiber grating 513 divides the light generated in the amplifying medium 521 into downstream channels having different wavelengths and reflects the downstream channels to the amplifying medium 521. In the optical fiber grating 513 includes a plurality of Bragg gratings having different periods or sampled gratings, which are formed on an optical fiber.

The amplifier 520 includes the amplifying medium 521, a pump light source 522, and a wavelength selective coupler 523. The amplifying medium 521 generates light over a wide wavelength range to output the generated light to the optical fiber grating 513. Further, the amplifying medium 521 amplifies the downstream channels reflected in the optical fiber grating 513 to output the amplified downstream channels to the multiplexer/demultiplexer 501. A rare-earth doped fiber capable of generating spontaneous emission light having a predetermined wavelength range may be used as the amplifying medium 521.

The pump light source 522 generates pump light for pumping the amplifying medium 521. The wavelength selective coupler 523 is located between one end of the optical fiber grating 513 and the amplifying medium 521, thereby outputting the pump light and the channels to the amplifying medium 521, and outputting the light, which is inputted from the amplifying medium 521, to one end of the optical fiber grating 513.

The multiplexer/demultiplexer 501 multiplexes the downstream channels, which are inputted from the multi-wavelength light source 510, according to the respective wavelengths and outputs the multiplexed channels to a corresponding semiconductor light source 501-1,~, or 501-N. Further, the multiplexer/demultiplexer 501 multiplexes downstream optical signals having different wavelengths generated in the semiconductor light sources 501-1 to 501-N by a mode-lock and outputs the multiplexed optical signals to the circulator 503.

Each of the semiconductor light sources 501-1 to 501-N generates a downstream optical signal mode-locked by a corresponding downstream channel from among the downstream channels multiplexed by the multiplexer/demultiplexer 501 and may employ a reflective semiconductor optical amplifier or an fabry-perot laser.

The circulator 503 is located between the multi-wavelength light source 510 and the multiplexer/demultiplexer 501, and is linked to the remote node 540 through a single mode optical fiber. That is, the circulator 503 outputs the downstream channels to the multiplexer/demultiplexer 501 and outputs the downstream optical signals multiplexed by the multiplexer/demultiplexer 501 to the remote node 540.

One end of the remote node 540 is linked to the circulator 503 of the central office 530 through a single mode optical fiber, and the other end of the remote node 540 is linked to subscriber units 550-1 to 550-n each through another single mode optical fiber. That is, the remote node 540 includes a demultiplexer 541 for demultiplexing the multiplexed downstream optical signals according to respective wavelengths and outputting the demultiplexed downstream optical signals to a corresponding subscriber unit.

The subscriber units 550-1 to 550-n respectively include photodetectors 550-1 to 550-N for detecting corresponding downstream optical signals demultiplexed by the demultiplexer 541 of the remote node 540.

In a multi-wavelength light source according to the present invention, a plurality of Bragg gratings having different periods divide light over a wide wavelength range generated in an amplifying medium into respective channels having different wavelengths, and modulate each of the divided channels into an optical signal, so that a wavelength division multiplexed communication system for a wavelength division multiplexed local area network can be constructed at a low price. Further, a broadband light source of an optical communication system, such as a wavelength division multiplexed passive optical network, may lose many portions between spectrums in the course of spectrum division, which make the broadband light source be inefficient. However, the present invention employs the multi-wavelength light source as a broadband light source in an optical communication system in a wavelength division multiplexed passive optical network. Therefore, a more efficient communication system can be constructed.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A wavelength division multiplexing system including a central office configured to generate downstream optical signals, a plurality of subscriber units configured to receive corresponding downstream optical signals, and a remote node configured to connect the central office to the subscriber units, the central office comprising a multi-wavelength light source, a multiplexer/demultiplexer, and a plurality of semiconductor light sources, the multi-wavelength light source including an amplifier and an optical fiber, the amplifier configured to generate light over a predetermined wavelength range, the optical fiber grating configured to divide the light into a plurality of downstream channels having different wavelengths to reflect the downstream channels to the amplifier, the multiplexer/demultiplexer is configured to demultiplex the downstream channels generated in the multi-wavelength light source according to respective wavelengths, the semiconductor light sources are configured to generate downstream optical signals mode-locked by corresponding downstream channels from among the downstream channels multiplexed by the multiplexer/demultiplexer, wherein the multiplexer/demultiplexer is configured to multiplex the downstream optical signals inputted from the semiconductor light sources to output the multiplexed optical signal to the remote node.

2. The wavelength division multiplexing system as claimed in claim 1, wherein the central office further includes a circulator disposed between the multi-wavelength light source and the multiplexer/demultiplexer, so that the circulator outputs the downstream channels to the multiplexer/demultiplexer and outputs the downstream optical signals multiplexed by the multiplexer/demultiplexer to the remote node.

3. The wavelength division multiplexing system as claimed in claim 1, wherein the remote node includes a demultiplexer, which is coupled to the circulator of the central office through a single mode optical fiber and to subscriber units each through another single mode optical fiber, so that the demultiplexer demultiplexes the multiplexed downstream optical signals according to respective wavelengths and outputs the demultiplexed downstream optical signals to a corresponding subscriber unit.

4. The wavelength division multiplexing system as claimed in claim 1, wherein each of the subscriber units includes a photodetector for detecting a corresponding downstream optical signal demultiplexed by the demultiplexer of the remote node.

5. The wavelength division multiplexing system as claimed in claim 1, wherein the semiconductor light source includes a reflective semiconductor optical amplifier.

6. The wavelength division multiplexing system as claimed in claim 1, wherein the semiconductor light source includes an fabry-perot laser.

7. The wavelength division multiplexing system as claimed in claim 1, wherein the amplifier of the multi-wavelength light source includes:
- an amplifying medium for outputting the light over the predetermined wavelength range and amplifying the downstream channels;
- a pump light source for generating pump light; and
- a wavelength selective coupler disposed between the optical fiber grating and the amplifying medium, so that the wavelength selective coupler outputs the pump light and the channels to the amplifying medium and outputs the light from the amplifying medium to the optical fiber grating.

* * * * *